July 21, 1936.    E. CAMERON    2,048,245

POLYPHASE ALTERNATING CURRENT RECTIFYING SYSTEM

Filed Jan. 12, 1935

INVENTOR
Ewen Cameron
BY
Ben J. Chromy
ATTORNEY

Patented July 21, 1936

2,048,245

UNITED STATES PATENT OFFICE 2,048,245

POLYPHASE ALTERNATING CURRENT RECTIFYING SYSTEM

Ewen Cameron, Spean Bridge, Scotland

Application January 12, 1935, Serial No. 1,585
In Great Britain January 16, 1934

6 Claims. (Cl. 175—363)

The invention relates to improvements in polyphase alternating current rectifying systems.

In converting polyphase alternating current, by rectification, to continuous current, it is desirable that the number of phases rectified should be large so that the fluctuation in continuous current electrical pressure is reduced.

The increase in the number of phases rectified brings about an inverse variation in the period during which each rectifying unit carries useful current. For this reason the size of the rectifier system is increased for a given output with increase in the number of phases rectified. This is because the dimensions of the rectifying units cannot be reduced directly in proportion with the current carrying period as the heating effect varies as the second power of the current.

The object of the present invention is to provide a method for obtaining continuous current from polyphase alternating current sources by improved means whereby the size of the rectifying system may be kept within much smaller limits than has hitherto been possible.

Another object of the invention is to provide a rectifying system for polyphase current supply sources having more than three phases, the alternating current lines being connected to first stage rectifying units, these first stage rectifying units being connected into groups by connectors paralleling the outputs of two or more units carrying load currents which are adjacent in phase, the output leads from these first stage groups being connected to individual second stage units, and if desired and if the number of phases is sufficiently large, the same principle of grouping may be applied to the second stage units and to further rectifying units which are connected finally to a continuous current circuit.

Figure 1:
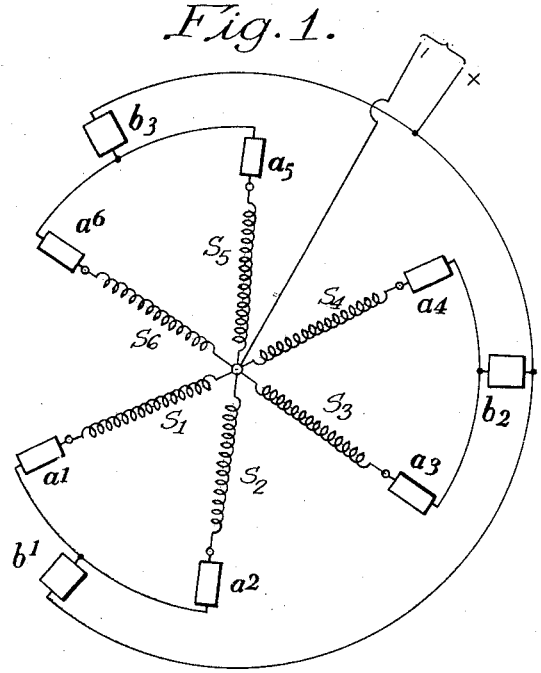
Figure 2:
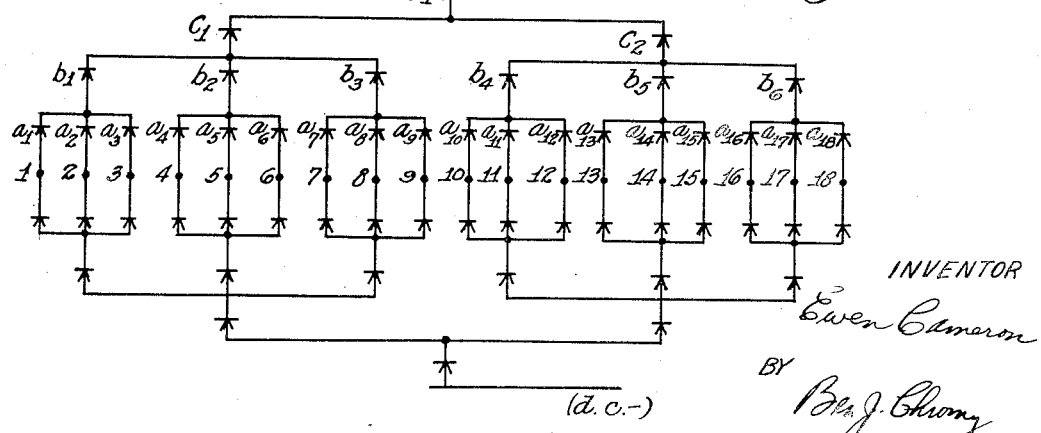

The method according to the invention as well as the apparatus for carrying the same into effect will fully appear by a perusal of the following specification and claims:

Figure 1 shows a simplified diagram of the system according to the invention and Figure 2 shows a still further simplified diagram of a system according to the invention and comprising a larger number of phases. In the drawing the primary rectifying units are indicated by the reference letter and numeral combinations $a_1$, $a_2$, $a_3$ and so on. Similarly the secondary rectifying units are indicated by the reference letter and numeral combinations $b_1$, $b_2$, $b_3$ and so on.

Figure 1 shows the principle applied to a six-phase rectifier. For simplicity in the drawing a neutral transformer point and half-wave rectification is shown. In the case of an alternating current supply comprising $n$ phases, $n$ being any number greater than three, each phase line is connected to a small rectifying unit $a_1$, $a_2$, $a_3$ and so on. These small rectifying units of the first stage are only capable of withstanding the maximum potential difference between adjacent phases, so that if the outputs of two adjacent first stage units are connected there is no circulating current.

The output terminals of these primary units are connected in pairs, adjacent units having a common output. To each common output from adjacent pairs is connected a rectifying unit of the second stage, $b_1$, $b_2$, $b_3$ and so on. These second stage rectifying units are each capable of withstanding the potential difference between output terminals of adjacent primary groups.

That is, if $a_1$ and $a_2$ have their outputs linked to form a primary group and if similarly $a_3$ and $a_4$ form an adjacent primary group then each second stage unit $b_1$, $b_2$, $b_3$, is capable of withstanding the maximum potential difference between the link of $a_1$, $a_2$ and the link of $a_3$, $a_4$.

Each unit of the second stage having an input from the combined output of two adjacent first stage units, that is, two adjacent phases, operates as a rectifier carrying useful current for twice as long a period as the units of the first stage, and operates with improved form factor. The method may be continued to further groups in like manner provided the voltage rating of each stage is such as to prevent circulating current.

In certain cases it is preferable to parallel more than two adjacent units in any one group, for example $a_1$, $a_2$, $a_3$ of first stage might feed $b_1$ of second stage, that is, three units are paralleled in each first stage group. Each first stage unit must now be capable of withstanding the maximum potential between $a_1$ and $a_3$ to prevent a circulating current on grouping.

The output is obtained from the combined output leads from the final stage units and the transformer neutral point, or, using full wave rectification, from the two final groups. The application of the principle is equally valid for half-wave or full-wave rectifiers.

Figure 2 shows the grouping principle of the present invention applied to an 18-phase full-wave rectifier. The terminal points numbered 1, 2, 3, to 18 are connected to the 18 phase supply lines so that the phases are in the same order as the numbers, that is points having consecutive numbers are connected to supply lines of consecutive phases. The rectifying units, $a_1$, $a_2$, $a_3$, carry current impulses which are adjacent in phase relation, and are grouped by connecting outputs. Each has a voltage rating sufficient to prevent circulating current due to the maximum tension between terminals 1 and 3. The first stage units are thus connected into groups of 3 units adjacent in phase, the output of each group feeding a subsequent individual rectifying unit of the second stage. Since the load current passes from one first stage unit to another according to the phase succession (which is the numeral order) it is carried by each first stage group in succession, so the individual rectifiers $b_1$, $b_2$, etc. connected to first stage groups carry the load current in succession, that is, there is a phase succession in the current impulses carried by the second stage units. The units of the second stage are connected into groups of units carrying current impulses which are adjacent in phase, members of a group having a common output and each group feeding a subsequent individual rectifying unit, for example, $b_1$, $b_2$, $b_3$, form one second stage group feeding one third stage unit $c_1$. The units of the second stage $b_1$, $b_2$, etc. are of such a voltage rating that there is no circulating current round members of a group, the grouping principle is thus applied to the second stage units in the same way as to the first. In an efficient design the second stage units are of greater current carrying capacity than those of the first stage.

The third stage units $c_1$, and $c_2$, are similarly treated, units adjacent in phase being grouped to feed an individual fourth stage unit $d_1$.

In the example shown in the drawing the units of the first stage are connected 3 in a group, so also are those of the second stage; the units of the third stage are connected 2 in a group. The optimum number of units per group differs in particular cases. The number of stages depends on the number of phases and maximum voltage.

A similar combination of rectifiers is connected between the alternating current lines and the negative continuous current side.

In grouping rectifier units as described herein according to this invention, no greater voltage stress is applied to the rectifiers than in the normal multi-limbed rectifier. Along any one path from phase line to continuous current output the rectifying elements in series have still to withstand only the alternating current diametrical voltage.

On account of the improved current form-factor in stages subsequent to first stage it is possible to reduce rectifying material as compared with the normal type of rectifier by this method of grouping. Moreover if the sectional area of the rectifying units in each group is arranged to allow all elements to operate at the same current density, as in a normal ungrouped system, the grouped system shows a saving in heat loss of the same order as the saving in material as compared with a normal rectifier.

Having thus fully described my invention, what I claim is new and desire to protect by Letters Patent is:—

1. A polyphase rectifying system comprising first stage rectifying units connected to the alternating current phase lines, said rectifying units selected in groups of rectifying units carrying load currents which are adjacent in phase, output leads of units in each first stage group connected together and to an individual second stage rectifying unit, output leads of individual second stage rectifying units carrying load currents which are adjacent in phase in the second stage, and further stages so derived, connected respectively into second stage groups and groups of stages of higher orders, and to individual rectifying units in respective subsequent stages, output leads of final stage rectifying units connected to continuous current lines.

2. A method for obtaining rectified current from polyphase alternating current sources comprising connecting rectifying units to individual phases, connecting rectifying units from adjacent phases into groups, connecting said groups to individual secondary rectifying units, and connecting outputs of the secondary units together and to one side of a load circuit.

3. A method for obtaining rectified current from polyphase alternating current sources comprising connecting primary rectifying units to individual phases, connecting rectifying units from adjacent phases into groups each group having a common output, connecting secondary rectifying units to each of said groups, connecting said secondary rectifying units into groups and connecting said groups of secondary units together and to one side of a continuous current system.

4. A polyphase rectifying system comprising a plurality of phases, rectifying units connected to each phase, means for connecting adjacent units together to form groups, secondary rectifying units connected respectively to various ones of said groups, and a common rectified current output lead from said secondary rectifying units for connecting said last-mentioned units to a load circuit.

5. A polyphase rectifying system comprising six or more phases, rectifying units connected to each phase, output leads from at least three adjacent rectifying units, means for connecting said output leads together into groups, a second stage rectifying unit for each of said groups, and means for connecting said second stage units to a load circuit.

6. A polyphase rectifying system comprising primary rectifying units connected to adjacent phase lines of such voltage rating as to prevent circulating current thereover, means for connecting the output circuit of at least two adjacent rectifying units together to form groups, secondary rectifying units connected to said groups, said secondary rectifying units being connected into groups and being of such voltage rating as to prevent circulating current thereover, means for connecting output leads from said secondary unit groups to additional rectifying means of such voltage rating as to prevent circulating currents, and means for connecting a load circuit to said last mentioned means.

EWEN CAMERON.